United States Patent [19]  [11] 4,012,142
Serikawa  [45] Mar. 15, 1977

[54] COPYING MACHINE
[75] Inventor: Shiro Serikawa, Akishima, Japan
[73] Assignee: Copyer Co. Ltd., Tokyo, Japan
[22] Filed: Aug. 28, 1975
[21] Appl. No.: 608,712
[30] Foreign Application Priority Data
  Sept. 2, 1974   Japan ............ 49-105568[U]
[52] U.S. Cl. .................. 355/66; 355/67
[51] Int. Cl.² ............. G03B 27/70; G03B 27/54
[58] Field of Search .......... 355/66, 67, 71, 49, 355/8, 11

[56] References Cited
UNITED STATES PATENTS 3,690,761 9/1972 Green .................. 355/66
3,752,573 8/1973 Miller .................. 355/66
3,832,057 8/1974 Shogren ................ 355/66

Primary Examiner—Donald A. Griffin
Attorney, Agent, or Firm—Cushman, Darby & Cushman

[57] ABSTRACT

A copying machine includes first and second original exposing sections and an optical system having a movable reflector. The optical system is so arranged as to permit a real image to be obtained when the reflector is moved in a first position corresponding to the first original exposing section and a mirror image to be obtained when the selective optical member in a second position corresponding to the second original exposing section.

5 Claims, 3 Drawing Figures

COPYING MACHINE

BACKGROUND OF THE INVENTION

This invention relates to a copying machine including an optical system for directing a light reflected from an original to a photosensitive surface.

Recently, attempts have been made to obtain a number of copies by using, as an original for a diazo type copying machine, a copy obtained from a dry type electrostatic copying machine. Since in the conventional electrostatic copying machine only a real image bearing copy is obtained from a normally opaque original, if it is used, as an original, in the diazo type copying machine, it must be fed into the diazo type copying machine with its toner image bearing surface contacting directly with a cylinder glass surface. In this case, the toner on the original tends to be attached onto the cylinder glass surface due to the toner image bearing surface contacting directly with the cylinder glass surface and due in part to the rise in temperature of the cylinder glass by a heat from a light source etc. As a result, the toner image of the original is blurred, failing to serve as an original. Furthermore, the cylinder glass surface is excessively smeared with the toner particles, resulting in lowered reproducibility.

SUMMARY OF THE INVENTION

This invention is based on the recognition that the diazo type copying machine suffers the above-mentioned drawback, since a real image bearing copy alone is normally obtained from the dry type electrostatic copying machine and thus if a mirror image bearing copy is obtained from the dry type electrostatic copying machine the above-mentioned drawback can be avoided. That is, if a mirror image is also obtained as an original from the dry type electrostatic copying machine, a plurality of real image bearing copies can be obtained in the diazo type copying machine by feeding a photosensitive paper with the toner image bearing surface of the original directly contacting with the photosensitive paper, so that the toner on the paper surface can not be attached onto the cylinder glass.

It is accordingly the object of this invention to provide a copying machine capable of readily obtaining selectively a real image and a mirror image bearing copy using a simple construction.

DETAILED DESCRIPTION OF THE PREFERRED EMBODIMENT

An electrostatic copying machine according to the embodiment of this invention will now be explained below.

Figure 1:
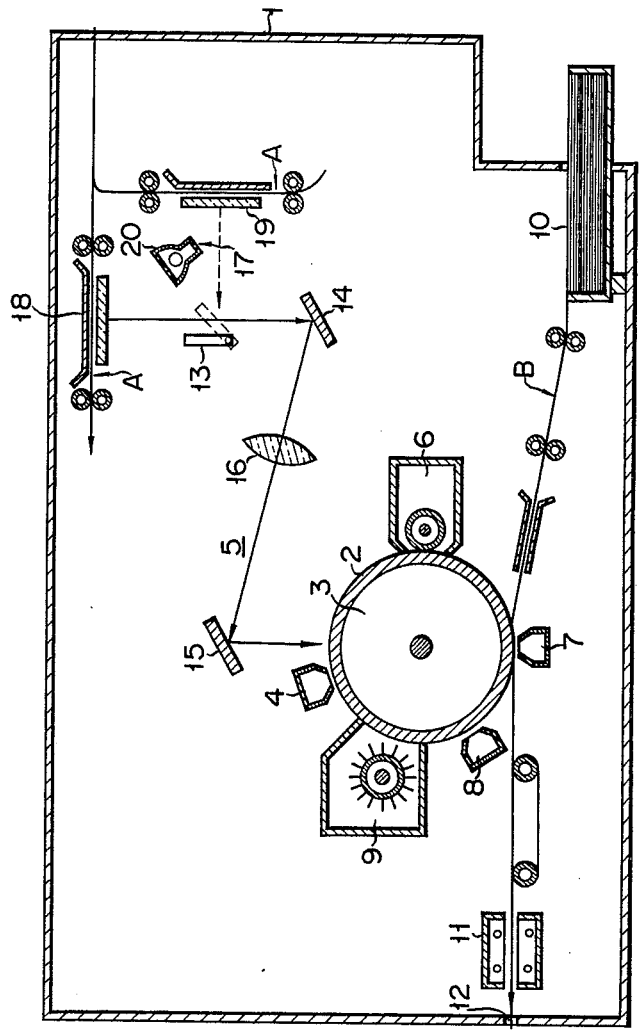
FIG. 1 is a cross-sectional view schematically showing an electrostatic copying machine according to the embodiment of this invention.

In FIG. 1 a drum 3 whose outer periphery is coated with a photosensitive layer 2 made of selenium, is rotatably mounted within a housing 1 of the electrostatic copying machine. Along the outer periphery of the drum 3 are provided an electrically charging mechanism 4, exposing mechanism 5, developing mechanism 6, transfer mechanism 7, electric charge eliminating mechanism 8 and cleaning mechanism 9 in this order. On one side of the rotatable drum 3 is mounted a copying paper supply mechanism 10 adapted to supply a copying paper between the rotatable drum 3 and the transfer mechanism 7. On the other side of the rotatable drum 3 is provided a fixing mechanism 11 adapted to fix the developed copying paper transferred from the rotatable drum 3, as well as a delivery mechanism 12 adapted to deliver the copying paper fixed by the fixing mechanism 11 to the outside. The operation of the above-mentioned mechanisms and their relative position are already known in the art and, each time the photosensitive drum 3 makes one rotation, the process of charging, exposing, developing, transferring, electric charge eliminating and cleaning is effected by the respective mechanism, thereby transferring an original image to a copying paper.

The exposing mechanism 5 includes a light source 17, first, second and third reflectors 13, 14 and 15 and a converging lens 16 disposed between the second reflector 14 and the third reflector 15.

Within the housing 1, a first original exposing section 18 is provided to extend in a horizontal direction, and a second original exposing section 19 extends in a vertical direction. The light source 17 is located between the first original exposing section 18 and the second original exposing section 19. The light source 17 can selectively illuminate the first and second original exposing sections 18 and 19 as required. In this preferred embodiment the light source 17 includes a shield cover 20 opened at one end and rotatably mounted on the housing 1. The shield cover 20 can be so rotated that when its open end faces the first original exposing section 18 the light source 17 illuminates it and when its open end is directed to the second original exposing section 19 the light source 17 illuminates it. The first reflector 13 is so mounted that it can be rotated through an angle of about 40°. The first reflector 13, when it is in a first rotation position, is away from a light path leading to the second reflector 14 from the first original exposing section 18 and, in a second rotation position it receives a light from the second original exposing section 19 and reflects it toward the second reflector 14.

Figure 2:
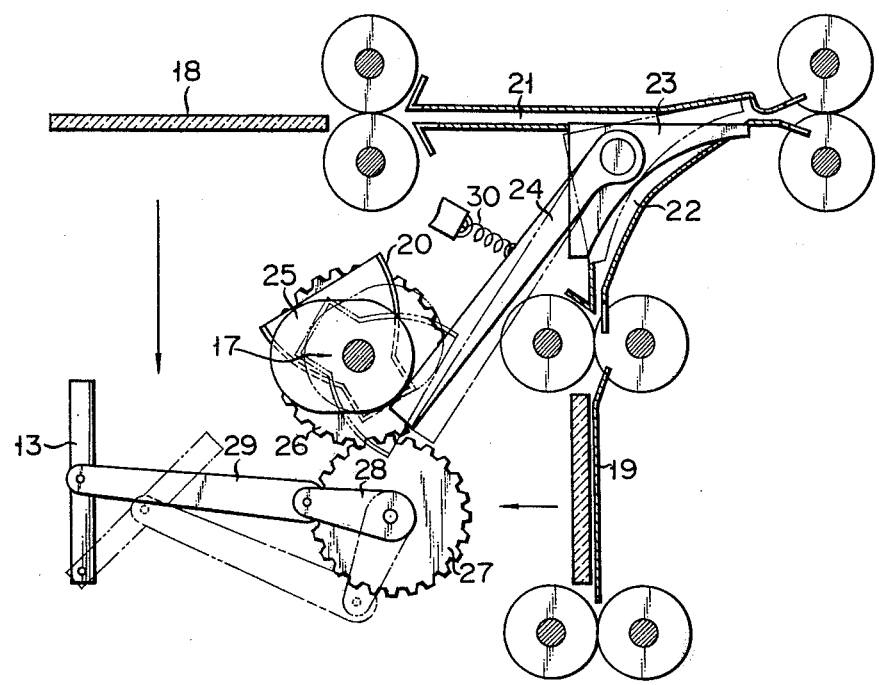
FIG. 2 is an enlarged, partial cross-sectional view of FIG. 1.

The relation between the first reflector 13, light source 17, and first and second original exposing sections 18 and 19 will now be described more in detail by reference to FIG. 2.

An original guide passage 21 is provided on the inlet side of the upper portion of the housing (not shown in FIG. 2) so as to extend in a horizontal direction. The first original exposing section 18 is located, through a pair of pinch rollers, ahead of the original guide passage 21. The first original exposing section 18 has a transparent support plate as known in the art. The original guide passage 21 communicates with an inclining passage 22 which in turn communicates with the vertically extending second original exposing section 19 through a pair of pinch rollers. The second original exposing section 19 has a transparent support plate on the side of the first reflector 13. The inclining passage 22 has one side defined by the inclining surface of a substantially right-triangular, passage defining member 23. The passage defining member 23 is selectively swingable between a first position as indicated in a solid line in which the guide passage 21 communicates with the first original exposing section 18 and shuts off communication with the second original exposing section 19 and a second position as indicated in a dashed line in which the guide passage 21 communicates with the second original exposing section 19 through the inclining passage 22 and shuts off communication with the first original exposing section 18.

A swingable arm 24 has its base end integrally mounted, through a common pin, on the swingable member 23, and the free end of the swingable arm 24 is abutted, under the urging force of a tension spring 30, against the work surface of an eccentric cam 25 swingably mounted on the housing. The shield cover 20 for the light source 17, as well as a first gear 26, is integrally mounted, through a common pin, on the eccentric cam 25. The first gear 26 is in mesh with a second gear 27 on which the base end of a crank 28 is integrally mounted through a common pin. A link 29 has one end pivoted to the free end of the crank 28 and the other end pivoted to the side of the first reflector 13, the base end of which is pivoted to the housing.

When a switch, not shown, is actuated to be brought into a first position, the cam 25 is swung, through a suitable connecting mechanism, into a first position indicated by a solid line. As a result, the first reflector 13, shield cover 20 and the passage defining member 23 are each swung into a position indicated by a solid line so as to be ready for a copying operation. When the switch is brought into a second position, the cam 25 is swung through an angle of 150° into a second position indicated by a dashed line through the above-mentioned suitable connecting mechanism. The connecting mechanism between the switch and the cam 25 may be of either mechanical or electrical type using a motor and will be able to be easily put into practice by those skilled in the art. The swinging movement of the cam 25 into the second position brings the first reflector 13, shield cover 20 and passage defining member 23 into a second position indicated by a dashed line so as to be ready for another copying operation.

The operation of the copying machine according to the embodiment of this invention will now be described below.

Now suppose that a real image bearing copy is obtained. When the switch is actuated to cause the first reflector 13, shield cover 20 and member 23 to be brought into a first position while an original A is inserted into the guide passage 21, then the original A is fed to the first exposing section 18. With an exposure switch rendered ON, the light source 17 illuminates the original A in the first exposing section 18 with the aid of the shield cover 20. A light reflected from the transparent support plate, and thus the original A, in the first original exposing section 18 falls directly on the second reflector 14 without passing through the first reflector 13 and it is sent from there to the photosensitive surface 2 of the rotatable drum 3 through the converging lens 16 and third reflector 15, and a corresponding image is transferred as a real image to the copying paper B as in the conventional copying machine.

Next suppose that a mirror image bearing copy is obtained. When the switch is actuated to bring the first reflector 13, shield cover 20 and member 23 into a second position while the original A is inserted into the guide passage 21, then the original A is fed to the second original exposing position 19 through the action of the member 23, where it is located. With the exposure switch rendered ON, the light source 17 is directed toward the second original exposing section 19 and illuminates the original A with the aid of the shield cover 20. A light reflected from the original A in the second original exposing section 19 falls, through the first reflector 13, on the second reflector 14 and it is sent from there to the photosensitive surface 2 of the rotatable drum 3 through the converging lens 16 and third reflector 15, and a corresponding image is transferred as a mirror image to the copying paper B. In this case it will be easily understood that the mirror image is obtained since the image of the original A is reflected once more in comparison with the case where the real image is obtained.

Figure 3:
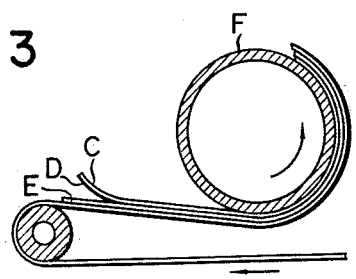
FIG. 3 is a partial cross-sectional view of a diazo type copying machine using, as an original, a mirror image bearing copy obtained from the machine according to this invention.

When the mirror image bearing copy C is used as an original in a diazo type copying machine, if a photosensitive paper E is fed around a cylinder glass F peripheral surface with a toner image bearing surface D of the copy C intimately contacting with the surface of the paper E as shown in FIG. 3, the image of the copy C is transferred as a real image to the photosensitive paper E without depositing any toner to the cylinder glass F peripheral surface.

Although in the above-mentioned copying machine the first original exposing section is disposed in the horizontal direction and the second original exposing section in the vertical direction, the first and second original exposing sections, both, may be disposed in a different place either in a horizontal direction or in a vertical direction. Although the first reflector is designed to be swung through an angle of 45°, the angle at which the first reflector is swung can be suitably selected so as to correspond to each of the first and second original exposing sections. In place of the first reflector use may be made of the other optical member, for example, a prism. The number of reflectors used may be suitably selected as required.

What is claimed is:

1. A copying machine comprising a housing having first and second original exposing sections to receive an original in position, photosensitive means provided within the housing, an optical system for illuminating said first and second original exposing sections and selectively directing to said photosensitive means a light reflected from the original in the original exposing section, and means for copying the original through said photosensitive means, said optical system including a selective optical member for permitting a real image to be obtained from the original in the first original exposing section when it is brought into a first position and a mirror image to be obtained from the original in the second original exposing section when it is brought into a second position including a reflector adapted to reflect the light from one of said first and second original exposing sections, a light source for selectively illuminating said first and second original exposing sections, and a shield cover for said light source selectively movable between a first position and a second position and adapted to illuminate said first original exposing section when it is brought into said first position and said second original exposing section when it is brought into said second position.

2. A copying machine according to claim 1 in which said housing has an original guide passage and a passage defining member for permitting said original guide passage to selectively communicate with said first and second original exposing sections.

3. A copying machine according to claim 2 further including a connecting mechanism mounted in association with said shield cover, said reflector and said passage defining member and adapted to, when said shield cover is selectively brought into each of said first and second positions, bring said reflector and said passage defining member into the corresponding position.

4. A copying machine according to claim 1 in which said optical system includes a first reflector for reflecting the light from said reflector and a light from the other of said first and second original exposing sections, a second reflector adapted to reflect the light of said first reflector and direct it to said photosensitive means, and a converging lens disposed between said first and second reflectors.

5. A copying machine according to claim 1 in which said photosensitive means is rotatably mounted within said housing and having a rotatable drum whose outer periphery is covered with a photosensitive layer.

* * * * *